(12) United States Patent
Nagayoshi et al.

(10) Patent No.: US 8,827,459 B2
(45) Date of Patent: *Sep. 9, 2014

(54) OPTICAL UNIT

(71) Applicant: Hitachi Consumer Electronics Co., Ltd., Tokyo (JP)

(72) Inventors: Mayumi Nagayoshi, Chofu (JP); Satoshi Ouchi, Kamakura (JP); Tadayoshi Kosaka, Yokohama (JP); Tomoki Kobori, Kamakura (JP); Yoshiho Seo, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/013,493

(22) Filed: Aug. 29, 2013

(65) Prior Publication Data

US 2014/0015874 A1    Jan. 16, 2014

Related U.S. Application Data

(63) Continuation of application No. 13/672,744, filed on Nov. 9, 2012, now Pat. No. 8,529,068, which is a continuation of application No. 12/759,027, filed on Apr. 13, 2010, now Pat. No. 8,308,301.

(30) Foreign Application Priority Data

Apr. 14, 2009   (JP) .................................. 2009-097589

(51) Int. Cl.
*G03B 21/00*   (2006.01)

(52) U.S. Cl.
USPC .................. 353/31; 353/20; 353/30; 353/81; 353/98; 353/99; 349/8; 349/104; 349/105

(58) Field of Classification Search
USPC ............... 353/20, 31, 81, 98, 99, 122, 85, 94; 349/5, 7, 8, 9, 104, 105, 106, 107; 359/197.1, 201.2, 212.1
See application file for complete search history.

(56) References Cited

U.S. PATENT DOCUMENTS

| | | |
|---|---|---|
| 5,502,490 A | 3/1996 | Takanashi et al. |
| 5,614,961 A | 3/1997 | Gibeau et al. |
| 5,871,266 A | 2/1999 | Negishi et al. |
| 5,903,379 A | 5/1999 | Kamikubo |

(Continued)

FOREIGN PATENT DOCUMENTS

| | | |
|---|---|---|
| JP | 2007-293226 | 11/2007 |
| JP | 2008-275798 | 11/2008 |

(Continued)

*Primary Examiner* — Sultan Chowdhury
(74) *Attorney, Agent, or Firm* — Antonelli, Terry, Stout & Kraus, LLP.

(57) ABSTRACT

An optical unit includes a light source that emits light to be projected onto a screen, one or a plurality of optical elements that controls a spread of a beam of light from the light source to the screen, a combining element that combines the light emitted from the light source, and a scanning element. The light source outputs an optical beam that will generate an elliptically shaped beam spot on the screen, the beam spot having a major axis substantially perpendicular to a scanning direction, and the light source is driven with pulse width modulation (PWM) so that one driven pulse corresponds to one beam spot on the screen.

10 Claims, 8 Drawing Sheets

(56) References Cited

U.S. PATENT DOCUMENTS

| | | |
|---|---|---|
| 6,102,545 A | 8/2000 | Ogino |
| 6,508,554 B2 * | 1/2003 | Hatakeyama et al. .......... 353/31 |
| 6,648,475 B1 | 11/2003 | Roddy et al. |
| 6,860,606 B2 | 3/2005 | Childers |
| 7,369,186 B2 | 5/2008 | Momoki |
| 7,744,770 B2 | 6/2010 | Doi et al. |
| 7,891,817 B2 | 2/2011 | Iwasaki |
| 7,972,011 B2 | 7/2011 | Kurozuka et al. |
| 8,113,660 B1 | 2/2012 | Troyer |
| 2002/0159036 A1 | 10/2002 | Yamagishi et al. |
| 2006/0001838 A1 | 1/2006 | Yoshii |
| 2006/0103810 A1 | 5/2006 | Ma et al. |
| 2006/0119941 A1 | 6/2006 | Yang et al. |
| 2006/0119943 A1 | 6/2006 | Yang et al. |
| 2007/0035508 A1 | 2/2007 | Yamazaki et al. |
| 2007/0273797 A1 | 11/2007 | Silverstein |
| 2010/0309438 A1 * | 12/2010 | Mizushima et al. ............ 353/31 |

FOREIGN PATENT DOCUMENTS

| | | |
|---|---|---|
| JP | 2008-541193 | 11/2008 |
| WO | WO 95/35630 | 12/1995 |
| WO | WO 2006/124378 | 11/2006 |

* cited by examiner

OPTICAL UNIT

CROSS REFERENCE TO RELATED APPLICATIONS

This application is a continuation of U.S. application Ser. No. 13/672,744, filed Nov. 9, 2012, now U.S. Pat. No. 8,529,068, which is a continuation of Ser. No. 12/759,027, filed Apr. 13, 2010, now U.S. Pat. No. 8,308,301, the contents of which are incorporated herein by reference.

This application claims priority from Japanese Patent Application JP P2009-097589, filed on Apr. 14, 2009, the content of which is hereby incorporated by reference into this application.

BACKGROUND OF THE INVENTION

The present invention relates to an image display device that displays an image by scanning a screen with an optical beam of a light source after modulation of the beam according to a particular level of an image signal. More particularly, the invention relates to miniaturizing an optical unit.

The new types of displays such as a DMD (Digital Mirror Device) type, liquid-crystal panel type, or optical scanning type display, which employ lasers or LEDs as light sources, are coming into existence to construct a large screen with a compact image-display device design. Using a white light source, for example, allows the volume of the light source to be reduced remarkably and thus the image display device to be dimensionally reduced. Using a monochromatic light source of, for example, red (R), green (G), and blue (B), further allows finer-image formation in addition to miniaturization.

JP-A-2007-293226, for example, discloses a laser display device that comprises focusing means including a plurality of laser diode elements each emitting laser light and scanning means for reflecting the laser light so that an image is projected onto a screen.

SUMMARY OF THE INVENTION

The conventional device that uses the technique disclosed in JP-A-2007-293226, however, is expensive since the plurality of laser light sources are arranged proximately. The conventional device has another problem in that since a large amount of heat occurs, optical axes of the light sources become misaligned and/or optical output intensity decreases. The device further presents the problem of degradation in resolution due to variations in beam spot sizes of the multiple lasers.

Accordingly, an object of the present invention is to provide: an optical unit that is simpler in structure, less expensive, and capable of offering higher-resolution image quality while reducing device dimensions and weight; and an image display device using the optical unit.

In order to attain the above object, an optical unit according to an aspect of the present invention comprises one or a plurality of light sources, one or a plurality of optical elements each controlling a spread of light, a combining element that combines optical beams emitted from each light source, and a scanning element; wherein the light source outputs an optical beam that will generate an elliptically shaped beam spot on the screen, the beam spot having a major axis substantially perpendicular to a scanning direction.

The present invention makes achievable a compact optical unit capable of providing high-resolution image quality, and an image display device using the optical unit.

DESCRIPTION OF THE PREFERRED EMBODIMENTS

Embodiments of the present invention are described below with reference to the accompanying drawings.

Figure 1A:
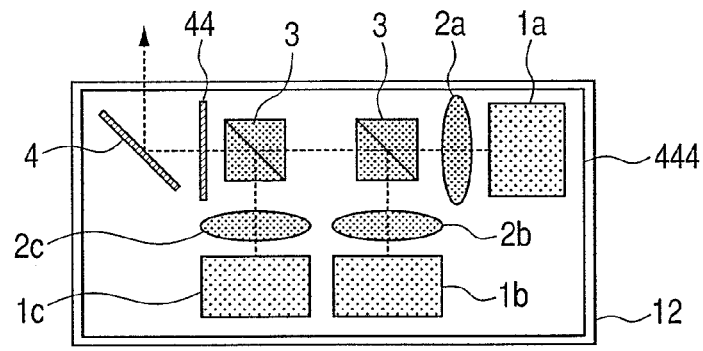
FIG. 1A schematically shows a configuration of an optical unit according to a first embodiment of the present invention.
Figure 1B:
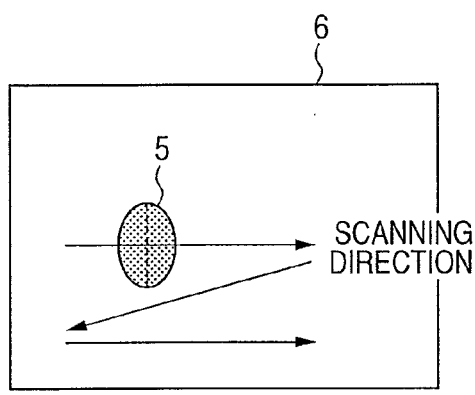
FIG. 1B shows a beam spot formed on a screen during projection by an image display device using the optical unit of the present invention.

FIG. 1A schematically shows a configuration of an optical unit according to a first embodiment of the present invention. The optical unit 12 according to the present embodiment includes a plurality of light sources 1a, 1b, and 1c, a plurality of optical elements 2a, 2b, and 2c that each control a spread of light, an element 3 that combines the lights emitted from the light sources, and a scanning element 4. The light from each of the light sources 1a, 1b, and 1c generates an elliptically shaped spot, a major axis of which is nearly perpendicular to a scanning direction as shown in FIG. 1B. Thus, for example, in a case where a plurality of isochromatic light sources are used as the light sources 1a, 1b, and 1c, even if a temperature change causes positions of light-emitting points of the light sources 1a, 1b, and 1c to shift or even if mounting positions themselves of the light sources 1a, 1b, and 1c shift, high luminance can be achieved without conspicuous misalignment of respective optical axes occurring. Conversely in a case where monochromatic light sources different from one another are used as the light sources 1a, 1b, and 1c, a color combiner 3 such as a color-combining mirror, prism, light guide, or optical fiber, will be used as the combining element 3. Timing of activation of the light sources can be controlled in the scanning direction, so a shift in color can be prevented from occurring, but the control is difficult in a direction perpendicular to the scanning direction. Meanwhile, the present invention has an advantage in that since spots can be disposed to be elongate with respect to the scanning direction, even if spots of different colors shift in position, overlapping area sizes of the spots will be large enough to prevent optical-axis misalignment and color shifting.

Figure 1C:
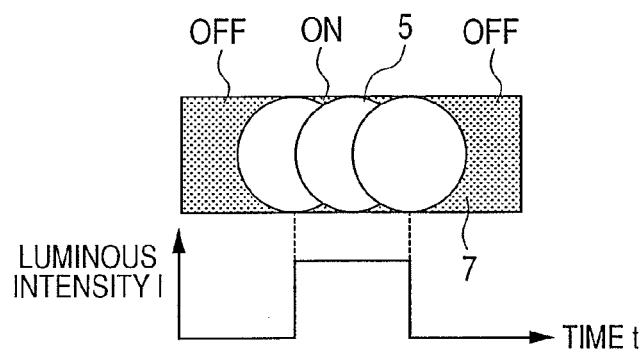
FIG. 1C shows beam spots formed on a screen, and luminous intensity levels obtained, during projection using a conventional driving method.

FIG. 1C shows beam spots formed on a screen, and luminous intensity levels obtained, during projection using a conventional driving method. In the conventional method, the fact that sizes of the beam spots for one pixel are nearly equal to one another and adjacent pixels are too dark has blurred the image, making high-resolution sharp image display difficult.

Figure 1D:
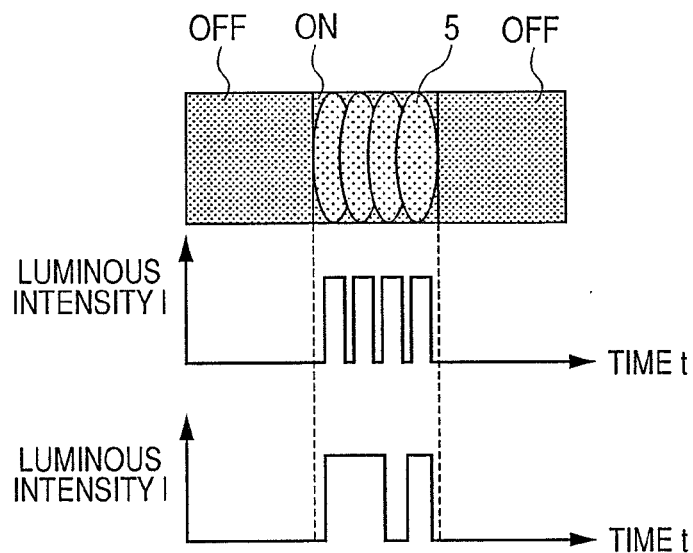
FIG. 1D shows beam spots formed on the screen, and luminous intensity levels obtained, during projection by the image display device using the optical unit of the present invention.

In the present invention, however, images are displayed at high resolution since, as shown in FIG. 1D, minor axes of the spots are short for one pixel, and thus since the light sources 1a, 1b, and 1c can be deactivated before the spots enter a next pixel.

For example, if the light sources 1a, 1b, and 1c here are of a laser type, electric power can be saved by stopping the laser oscillations during a black-color display period, since laser light can be modulated according to a particular image signal level. The light sources 1a, 1b, and 1c are secured using an ultraviolet (UV) curing resin or fixed by engagement. In order to provide highly sharp images by controlling a spread of the diffuse light emitted from each of the light sources 1a, 1b, and 1c, the optical elements 2a, 2b, and 2c, such as collimating and/or focusing lenses, optical fibers, or hologram elements, are disposed at immediate rear of the light sources. Shapes of the lenses in this case are convex, concave, spherical, or non-spherical. Cylindrical lenses may be disposed to shape the beams emitted from the light sources. The shaping allows incidence of the beams appropriately shaped according to a shape of a reflecting portion formed as part of the scanning element 4, and high efficiency is therefore obtained. At the same time, increases in temperature due to protrusion of any beams from the reflecting portion are suppressed.

The optical elements 2a, 2b, and 2c may be disposed immediately at rear of structures of the light sources 1a, 1b, and 1c, or alternatively the former may be disposed near the light-emitting points inside the structures. The disposition near the light-emitting points makes the optical elements 2a, 2b, and 2c acquire light more efficiently, as well as allowing generation of smaller spots on the screen 6 and hence, further improvement of image quality. The present embodiment assumes spot diameters of 1 mm or less on the reflecting portion of the scanning element 4. An actuator or a feedback sensor may be mounted such that the positions of the optical elements 2a, 2b, and 2c are automatically controllable according to the optical-axes of the light-emitting points of the light sources 1a, 1b, and 1c. This prevents the misalignment of the optical axes and provides high resolution.

The light sources 1a, 1b, and 1c used can be white or each can be of either a three-color type including R (red), G (green), and B (blue), or a four-color type including R (red), G1 (green 1), G2 (green 2), and B (blue), or including R (red), G (green), B (blue), and Y (yellow). White light sources 1a, 1b, and 1c enhance luminance. Monochromatic light sources 1a, 1b, and 1c of the three-color or four-color types significantly improve color reproducibility, enhancing image quality. A plurality of light sources 1a, 1b, and 1c that are 2 to 5 nanometers different from one another in wavelength may be used. This allows reduction of, for example, a speckle pattern caused by interference if laser light sources 1a, 1b, and 1c are used.

In addition, if LEDs or lasers are used as the light sources 1a, 1b, and 1c, and a dichroic mirror or a dichroic prism is used as the combining element 3, it suffices just to obtain optical characteristics of its dichroic surface in a wavelength region enabling the light sources 1a, 1b, and 1c to exhibit at least 10% of peak intensity on beam profiles (laser light intensity distribution diagrams) of the light sources. If the LED or laser light sources 1a, 1b, and 1c have a peaked light-emission distribution, not a broad one, it suffices just to obtain a transmittance/reflectance of at least 94%, as one optical characteristic of the dichroic surface, in a range of approximately +/−10 nm of a peak wavelength. For this reason, the number of layers on the dichroic surface can be reduced and thus the optical unit can be manufactured at a lower cost.

The plurality of light sources 1a, 1b, and 1c may be mounted in independent packages or in one package. Additionally, either the color-combining element 3 or the scanning element 4 may be mounted, with the light sources 1a, 1b, and 1c, in one package. Mounting in independent packages offers advantages in that heat becomes easy to release and in that the light sources 1a, 1b, and 1c elude a peak wavelength drift and an optical loss. Meanwhile, mounting in one package is advantageous in that using monochromatic light sources 1a, 1b, 1c renders both color combination and optical axis alignment easy.

The scanning element 4 may include one two-dimensional scanning member or two one-dimensional scanning members. The present embodiment assumes that the reflecting portion of the scanning element 4 has either a round, elliptical, square, or rectangular shape. The present embodiment also assumes that the reflecting portion is a maximum of 1 mm in size. Making the reflecting portion have a shape that fits the shape of the beam emitted from each of the light sources 1a, 1b, and 1c, and have a minimum size, weight can be reduced and a driving speed of the optical unit can be correspondingly increased for finer image quality.

The reflecting portion of the scanning element 4 uses, for example, an aluminum- or silver-deposited or dielectric, multilayered film, as its material. This material may be top-coated with $SiO_2$, $TiO_2$, or the like. Provided that a reflectance of at least 90% is obtained in the wavelength region that enables at least 10% of the peak intensity to be achieved on the beam profiles of the light sources 1a, 1b, and 1c, high-luminance images can be obtained and the amount of heat generated by the scanning element 4 can be reduced. The optical unit 12 can therefore be enhanced in efficiency.

The optical unit 12 can have an aperture 44, which will be disposed, for example, at immediate rear of an exit port of any one of the light sources 1a, 1b, and 1c, optical elements, and a combining element 3, or at an exit port of a housing 444. This will make it possible to remove flare that the particular light source itself has, and to remove any interference fringes, scattered light, stray light, spot shifts, and other unfavorable factors generated by the structures of the light sources 1a, 1b, and 1c, the optical elements 2a, 2b, and 2c, and the combining element 3. Beams of either a round, elliptical, square, or rectangular shape, will then be acquirable. In a case where the aperture 44 is disposed at the exit port of the housing 444, any scattered beams that may have impinged upon, for example, a torsion bar or the like, except at the reflecting portion of the scanning element 4, can be removed for finer spots.

The aperture 44 has an oblique cross-section, which may look like a stairway. This is effective for preventing diffracted light from occurring. The aperture is black in color, and is manufactured by, for example, alumite machining of a metal such as aluminum. An elongated hole for mounting the aperture 44 is provided in a bottom portion of the housing 444 in order to retain the aperture accurately in the x direction in the FIG. 1A. Accordingly, even if the light sources 1a, 1b, and 1c, the combining element 3, or other elements are disposed askew, the position of the aperture 44 can be adjusted to suit the optical axes, so that high-resolution spots with minimum flare can be obtained.

The housing 444 is formed from a metal such as aluminum, and is easy to work at a low cost. Hold members of the light sources 1a, 1b, and 1c, optical elements 2a, 2b, and 2c, and combining element 3, are independent of one another, each including a heat-releasing member. Thus, even if the light sources 1a, 1b, and 1c each send off a large amount of heat, the heat can be released from the light sources 1a, 1b, and 1c, without damaging the optical elements 2a, 2b, and 2c and the combining element 3. After sufficient release of the heat from the light sources 1a, 1b, and 1c, higher image quality can be obtained by preventing the occurrence of a peak wavelength drift, an optical output loss, and shifts in the positions of the light-emitting points. For example, even if the optical unit 12 of the present invention is mounted in a motor vehicle or a mobile phone and an ambient temperature of the optical unit 12 exceeds a specified range of the light sources 1a, 1b, and 1c, temperatures of the light sources can be lowered to stay within their guaranteed operating temperature ranges, such that high luminance can be obtained. A cushioning material may be disposed inside the housing 444 to enhance its impact resistance.

The housing 444 has an elongate hole in a holding position of the scanning element 4. This makes the scanning element 4 adjustable in the x direction in the FIG. 1A so that beams enter the scanning element 4 without loss, even if the light sources 1a, 1b, and 1c and/or the combining element 3 are disposed askew. The occurrence of heat can thus be suppressed.

Figure 2:
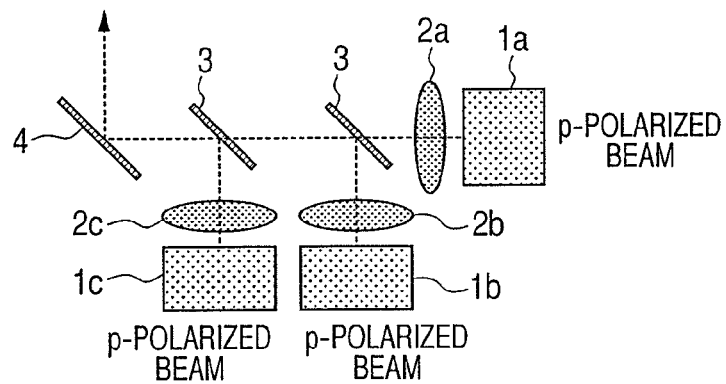
FIG. 2 schematically shows a configuration of an optical unit according to a second embodiment of the present invention.

FIG. 2 schematically shows a configuration of an optical unit according to a second embodiment of the present invention. The combining element 3 in the optical unit 12 is a color-combining element that conducts color syntheses upon p-polarized light.

The p-polarized light here refers to light waves whose electric field components are parallel to a plane of incidence. In contrast, s-polarized light refers to light waves whose electric field components are perpendicular to the plane of incidence. For example, in a case where the color-combining element 3 is a dichroic prism and additionally a dichroic mirror and the light sources 1a, 1b, and 1c have a light-emission distribution of a broad wavelength band, leading the p-polarized light to the color-combining element 3 enhances transmittance and reflectance, thus enhancing luminance.

The color-combining element 3 is provided with anti-reflective (AR) coating on various faces, to prevent unnecessary reflection. The color-combining element 3 is fixed to the housing 444 via an adhesive agent. The housing 444 has a groove formed for releasing an excess adhesive at the bottom thereof, hence allowing the color-combining element 3 to be accurately held without a clearance from the bottom.

Figure 3:
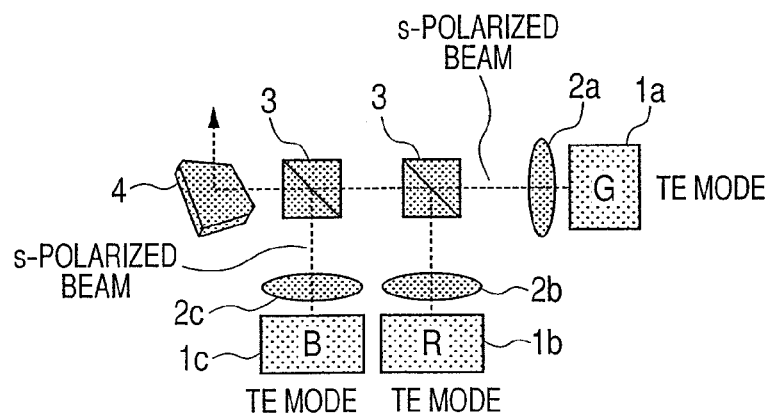
FIG. 3 schematically shows a configuration of an optical unit according to a third embodiment of the present invention.

FIG. 3 schematically shows a configuration of an optical unit according to a third embodiment of the present invention. The combining element 3 in the optical unit 12 is a color-combining element. The optical unit 12 includes the light sources 1a, 1b, and 1c that oscillate in TE (Transverse Electric) mode, the color-combining element 3 that the light emitted from each of the light sources 1a, 1b, and 1c will enter as s-polarized light, and a plane where the scanning element 4 is disposed differs from that where the color-combining element 3 is disposed. In this configuration of the optical unit 12, the major axis of a beam spot on a screen 6 can be made nearly perpendicular to a scanning direction, and high-resolution images free from conspicuous optical-axis misalignment can be obtained. The TE mode here refers to a state in which light waves vibrate in a minor-axis direction.

Figure 4:
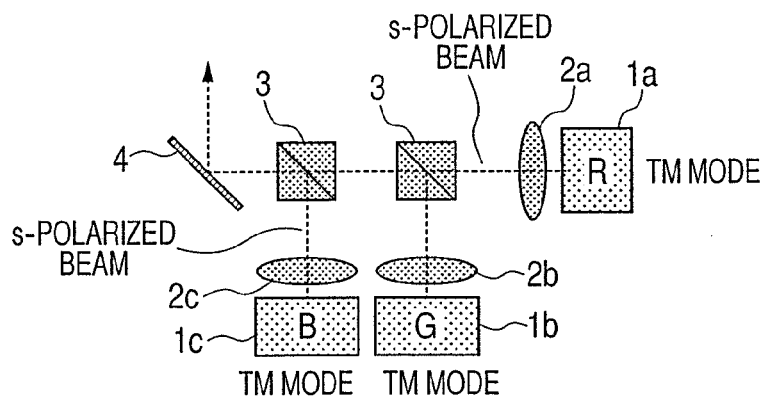
FIG. 4 schematically shows a configuration of an optical unit according to a fourth embodiment of the present invention.

FIG. 4 schematically shows a configuration of an optical unit according to a fourth embodiment of the present invention. The combining element 3 in the optical unit 12 is a color-combining element. The optical unit 12 includes the light sources 1a, 1b, and 1c that oscillate in TM (Transverse Magnetic) mode, and the color-combining element 3 that the light emitted from each of the light sources 1a, 1b, and 1c will enter as s-polarized light. In this configuration of the optical unit 12, the major axis of a beam spot on a screen 6 can be made nearly perpendicular to a scanning direction, and high-resolution images free from conspicuous optical-axis misalignment can be obtained. The TM mode here refers to a state in which light waves vibrate in a minor-axis direction.

Figure 5:
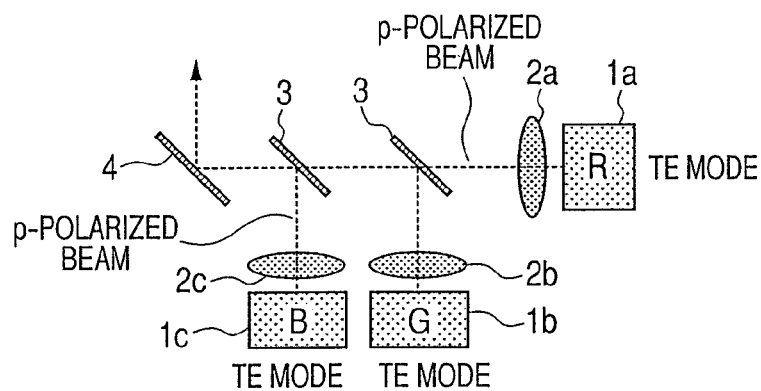
FIG. 5 schematically shows a configuration of an optical unit according to a fifth embodiment of the present invention.

FIG. 5 schematically shows a configuration of an optical unit according to a fifth embodiment of the present invention. The combining element 3 in the optical unit 12 is a color-combining element. The optical unit 12 includes the light sources 1a, 1b, and 1c that oscillate in the TE mode, and the color-combining element 3 that the light emitted from each of the light sources 1a, 1b, and 1c will enter as p-polarized light and change a traveling direction thereof. In this configuration of the optical unit 12, the major axis of a beam spot on a screen 6 can be made nearly perpendicular to a scanning direction, and high-resolution images free from conspicuous optical-axis misalignment can be obtained.

Figure 6:
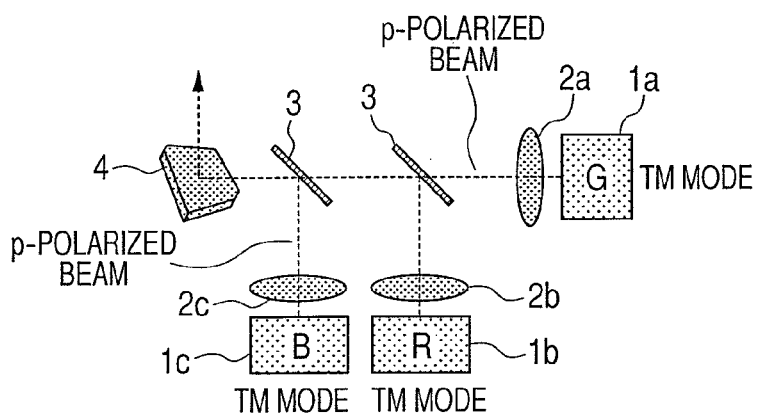
FIG. 6 schematically shows a configuration of an optical unit according to a sixth embodiment of the present invention.

FIG. 6 schematically shows a configuration of an optical unit according to a sixth embodiment of the present invention. The combining element 3 in the optical unit 12 is a color-combining element. The optical unit 12 includes the light sources 1a, 1b, and 1c that oscillate in the TM mode, and the color-combining element 3 that the light emitted from each of the light sources 1a, 1b, and 1c will enter as p-polarized light and change a traveling direction thereof. A plane where the color-combining element 3 is disposed differs from that where the scanning element 4 is disposed. In this configuration of the optical unit 12, the major axis of a beam spot on a screen 6 can be made nearly perpendicular to a scanning direction, and high-resolution images free from conspicuous optical-axis misalignment can be obtained.

Figure 7A:
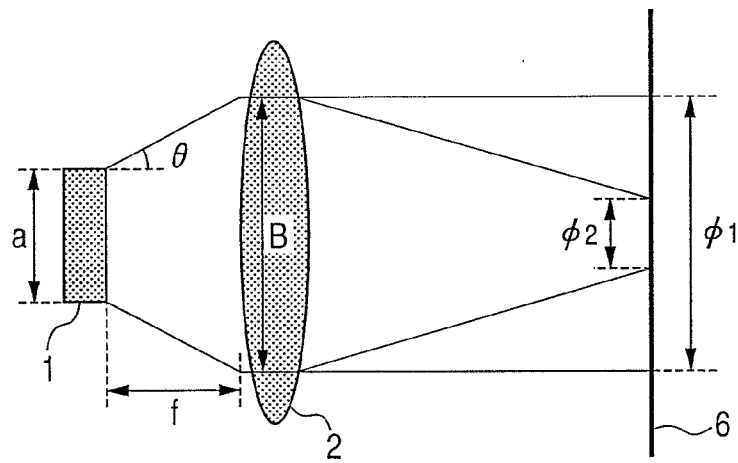
FIG. 7A is a diagram that shows a light source and optical element of the optical unit of the present invention, and a screen.
Figure 7B:
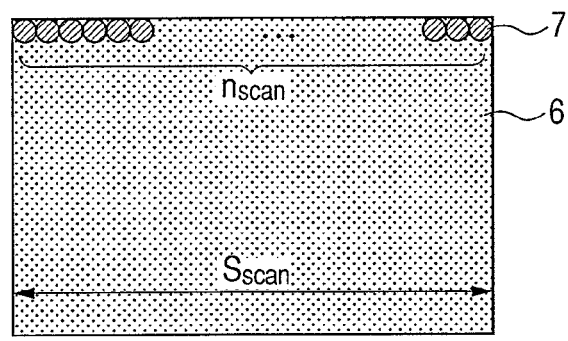
FIG. 7B is a diagram that shows the screen onto which an image is projected by the image display device using the optical unit of the present invention, and pixels in a scanning direction on the screen.
Figure 7C:
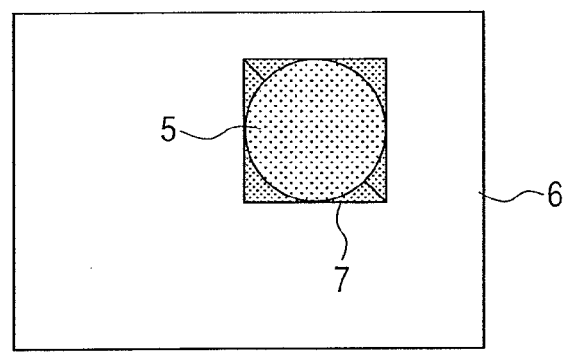
FIG. 7C is a diagram that shows one pixel on the screen and one beam spot formed thereon during projection by the image display device using the optical unit of the present invention.

FIG. 7A shows a light source 1 and optical element 2 of the optical unit 12 of the present invention, and a screen 6. FIG. 7B shows the screen 6 onto which an image is projected by the image display device using the optical unit 12 of the present invention, and pixels in the scanning direction on the screen. FIG. 7C shows one pixel on the screen 6 and one beam spot formed thereon during projection by the image display device using the optical unit 12 of the present invention.

The optical unit 12 set forth in claim 1 is configured to satisfy a relational expression of $$B = 2f \tan \theta + a \geq Sscan/nscan \geq \phi$$

where a horizontal spot size of a beam on an exit surface of an optical element 2 is defined as B (mm); a size of the beam spot in a scanning direction on a screen 6, as φ (mm); a distance from a light-emitting point of the light source 1 to the optical element 2, as "f" (mm); an angle formed by a spread direction of the light emitted from the light source with the optical axis, as θ(°); a size of the light-emitting point in a direction parallel to the scanning direction, as "a" (mm); a size of the screen 6 in the scanning direction, as Sscan (mm); and the number of pixels in a scan line in the scanning direction, as "nscan".

Thus, the size of one pixel and that of the beam spot become the same, such that a high-resolution sharp image can be obtained.

In addition, since it suffices for the optical unit to satisfy the above expression in the minor-axis direction of the spot, the present invention creates margins on lens design, compared with the case where the expression is applied to be satisfied in the major-axis direction, and lenses of small refractive power can be used. This makes the optical unit manufacturable at a lower cost. Furthermore, the shape of the light-emitting point can be rectangular as shown in FIG. 7A, or can be square, round, or elliptical. Substantially the same effects can be obtained for practically all shapes.

Figure 8:
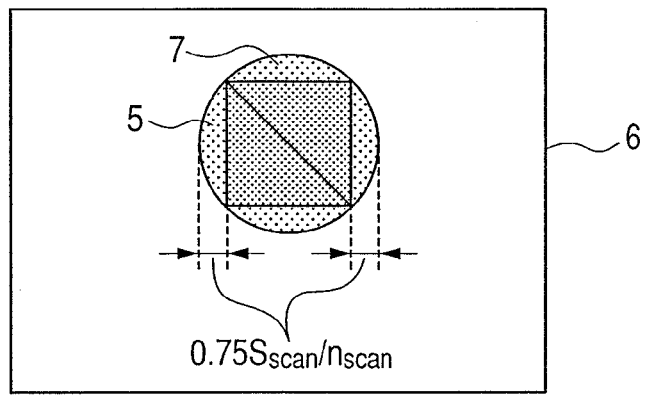
FIG. 8 is another diagram that shows one pixel on the screen and one beam spot formed thereon during projection by the image display device using the optical unit of the present invention.

FIG. 8 shows one pixel on the screen 6 and one beam spot formed thereon during projection by the image display device using the optical unit 12 of the present invention. The optical unit 12 in this case satisfies a relational expression of $$B = 2f \tan \theta + a \geq 1.5 Sscan/nscan \geq \phi$$

where a horizontal spot size of the beam on the exit surface of the optical element 2 is defined as B (mm); a size of the beam spot in the scanning direction on the screen 6, as φ (mm); a distance from the light-emitting point of the light source 1 to the optical element 2, as "f" (mm); an angle formed by a spread direction of the light emitted from the light source with the optical axis, as θ (°); a size of the light-emitting point in the direction parallel to the scanning direction, as "a" (mm); a size of the screen 6 in the scanning direction, as Sscan (mm); and the number of pixels in a scan line in the scanning direction, as "nscan". That is, a high-resolution image can be obtained when the beam spot size on the screen 6 is up to 1.5 times as great as the pixel size.

Figure 9:
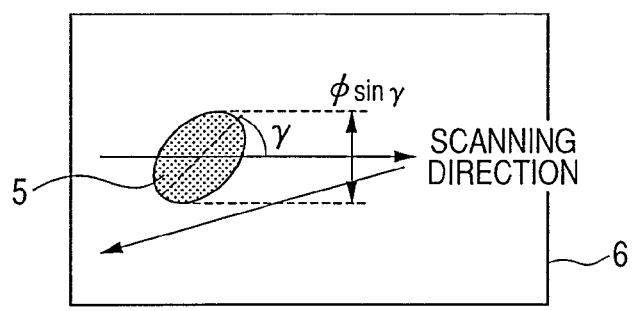
FIG. 9 is yet another diagram that shows a white beam formed on the screen during projection using the optical unit of the present invention.

FIG. 9 shows a beam spot formed on the screen 6 during projection by the image display device using the optical unit 12 of the present invention. The optical unit 12 set forth in claim 1 is configured to satisfy a relational expression of $$B = 2f \tan \theta + a \geq Sscan/nscan \geq \phi \sin \gamma, \text{ or}$$

$$B = 2f \tan \theta + a \geq 1.5 Sscan/nscan \geq \phi \sin \gamma$$

where a horizontal spot size of the beam on the exit surface of the optical element 2 is defined as B (mm); a size of the beam spot in the scanning direction on the screen 6, as φ (mm); an angle formed between the scanning direction and the major axis of the spot, as γ (°); a distance from the light-emitting point of the light source 1 to the optical element 2, as "f" (mm); an angle formed by a spread direction of the light emitted from the light source with the optical axis, as θ (°); a size of the light-emitting point in the direction parallel to the scanning direction, as "a" (mm); a size of the screen 6 in the scanning direction, as Sscan (mm); and the number of pixels in a scan line in the scanning direction, as "nscan".

That is, a high-resolution image can be obtained, even if the beam spot has the inclination angle γ with respect to the scanning direction. The above assumes that the inclination angle γ satisfies a requirement that the beam spot, when compared in size, is narrowed down in the scanning direction than in a direction perpendicular thereto.

Figure 10A:
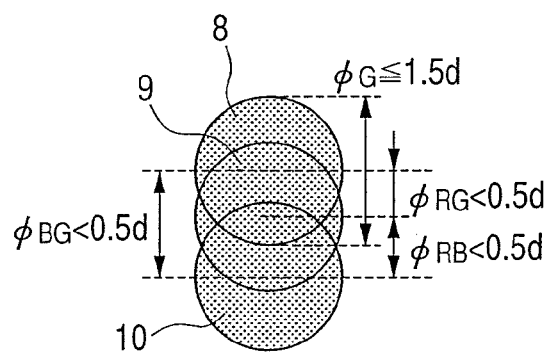
FIG. 10A is a further diagram that shows beam spots formed on the screen during projection by the image display device using the optical unit of the present invention.
Figure 10B:
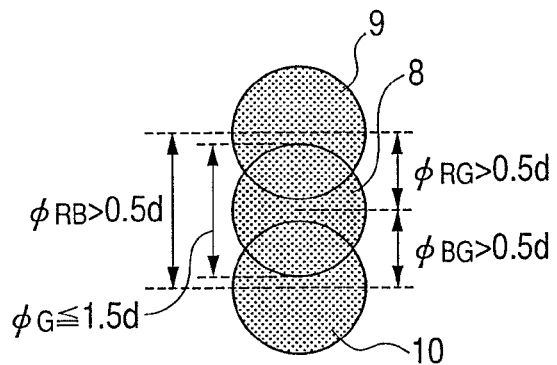
FIG. 10B is a further diagram that shows beam spots formed on the screen during projection by the image display device using the optical unit of the present invention.

FIG. 10A shows red (R), green (G), and blue (B) beam spots formed on the screen 6 during projection by the image display device using the optical unit 12 of the present invention. The optical unit 12 that includes R, G, and B three-color light sources 1a, 1b, and 1c, a plurality of optical elements 2a, 2b, and 2c for controlling a spread of light, a color-combining element 3 for combining the beams of light emitted from the light sources 1a, 1b, and 1c, and a scanning element 4, satisfies a relational expression of $$\phi G \leq 1.5d, \phi RB < 0.5d, \phi RG < 0.5d, \phi BG < 0.5d,$$

where a pixel pitch on the screen 6 is defined as "d"; a beam spot size of the G-light, as θG; a beam spot clearance between the R-light and the B-light, as φB; a beam spot clearance between the R-light and the G-light, as φRG; and a beam spot clearance between the B-light and the G-light, as φG.

For example, even if the positions or inclinations of the light sources 1a, 1b, and 1c or optical elements 2a, 2b, and 2c contain an error, when the above conditions are satisfied, the three colors, namely, R, G, and B, do not appear to be divided on the screen 6. Instead, the three colors are synthesized into white, with the result that a high-resolution image can be obtained. Conversely if either φRB, φRG, or φBG exceeds 0.5d, the colors appear to be divided on the screen 6, the result being that resolution deteriorates.

Figure 11:
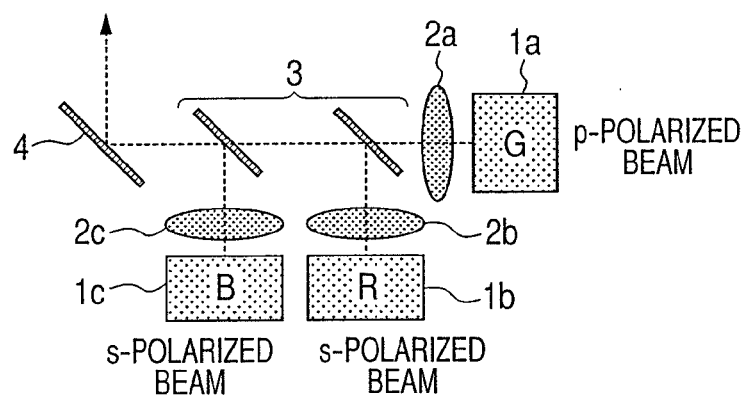
FIG. 11 schematically shows a configuration of an optical unit according to a seventh embodiment of the present invention.

FIG. 11 schematically shows a configuration of an optical unit according to a seventh embodiment of the present invention. In the optical unit set forth in claim 10, of all kinds of light from the light sources 1a, 1b, and 1c, only the R-light and the B-light enter the color-combining element 3 in the form of s-polarized light, and the G-light enters as p-polarized light. For example, when a dichroic prism or a dichroic mirror is used as the color-combining element 3, even when an emission distribution of the G-light is close to a broad one, high transmittance can be obtained in a wide wavelength range by leading the G-light as p-polarized light to the color-combining element 3. High luminance can therefore be achieved at a low cost with a minimum number of layers small in dichroic surface area.

Figure 12:
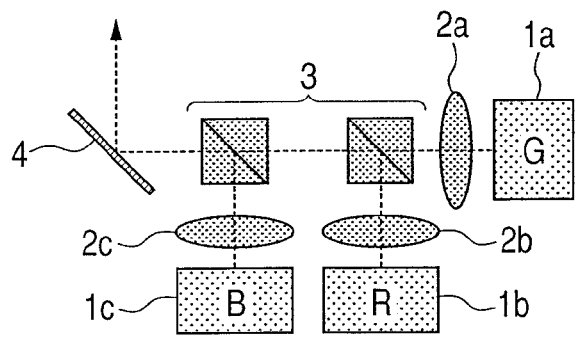
FIG. 12 schematically shows a configuration of an optical unit according to an eighth embodiment of the present invention.

FIG. 12 schematically shows a configuration of an optical unit according to an eighth embodiment of the present invention. In the optical unit 12 of the eighth embodiment, the number of optical elements 2a, 2b, and 2c through which B-light is passed is the smallest in all other embodiments described herein. The optical elements 2a, 2b, and 2c usually decrease in transmittance and reflectance in a wavelength region of 400 to 485 nm of the B-light. Reducing the number of optical elements 2a, 2b, and 2c through which the B-light is passed prevents the brightness thereof from decreasing, and correspondingly improves the optical unit 12 in luminance.

Figure 13A:
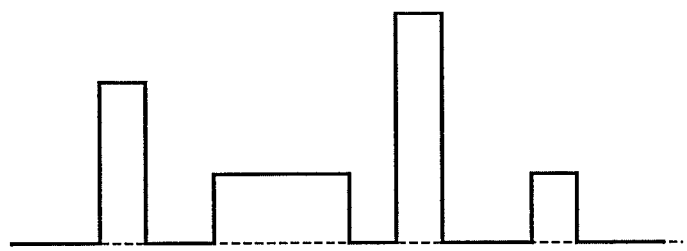
FIG. 13A is a diagram that schematically shows an example of time-varying changes in optical output level that are observed when the optical unit of the present invention is driven.
Figure 13B:
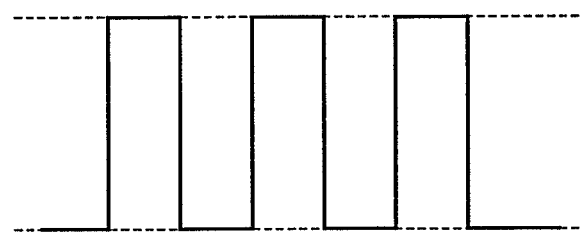
FIG. 13B is a diagram showing an example of a conventional driving method (PWM driving)
Figure 13C:
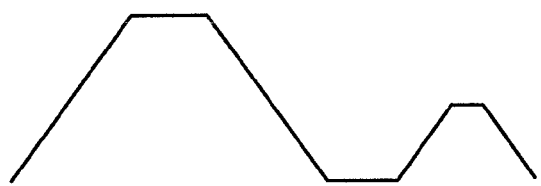
FIG. 13C is a diagram showing another example of a conventional driving method (analog driving)

FIG. 13A schematically shows an example of time-varying changes in optical output level that are observed when the optical unit of the present invention is driven. While the conventional driving method employs PWM driving based on fixed optical output (see FIG. 13B) or analog driving based on non-pulse modulation (see FIG. 13C), the optical unit 12 conducts PWM driving at variable optical output levels and repeats integration of these output levels over a definite time, before calculating optical outputs of R, G, B.

If the time-varying changes in the optical output levels of the PWM-driven light sources are expressed as P(t), a color temperature Kw calculated from chromaticity coordinates (xW, yW) derived from the following expression will satisfy 10,000 K≤Kw≤16,000 K:

$$X_B = \int \left( \int_{t=0}^{t} P(t)dt \right) \times \exp(-x^2/2) \times \overline{X}(\lambda)d\lambda,$$ [Expression 1]

$$Y_B = \int \left( \int_{t=0}^{t} P(t)dt \right) \times \exp(-x^2/2) \times \overline{Y}(\lambda)d\lambda,$$

$$Z_B = \int \left( \int_{t=0}^{t} P(t)dt \right) \times \exp(-x^2/2) \times \overline{Z}(\lambda)d\lambda,$$

$$x_W = \frac{X_R + X_G + X_B}{(X_R + Y_R + Z_R) + (X_G + Y_G + Z_G) + (X_B + Y_B + Z_B)},$$

$$y_W = \frac{Y_R + Y_G + Y_B}{(X_R + Y_R + Z_R) + (X_G + Y_G + Z_G) + (X_B + Y_B + Z_B)}$$

where $$\int_{t=0}^{t} P(t)dt$$

signifies a time integral of the optical output levels of R, G, B. Image quality high in color temperature can therefore be obtained. Color temperature is univocally determined from chromaticity coordinates (bibliography: http://www.spst-j.org/book/pdf/lecture/lec__2006.pdf). For example, a color temperature of 10,914 K and a deviation of 0.02 are derived from chromaticity coordinates of (xW, yW)=(0.26, 0.31).

Figure 14:
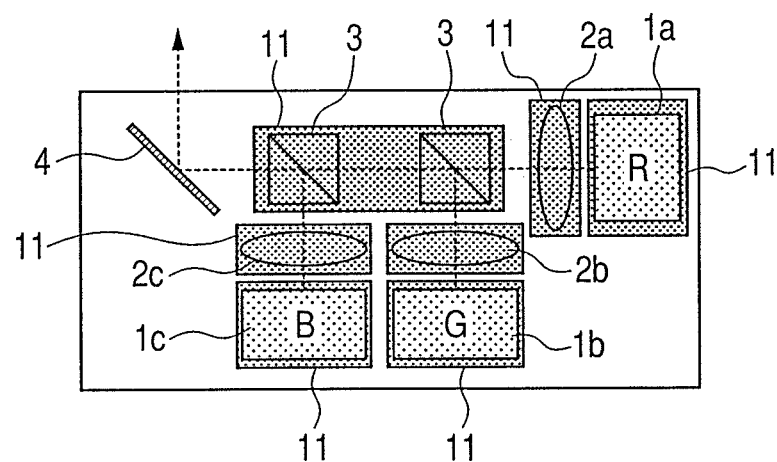
FIG. 14 schematically shows a configuration of an optical unit according to a ninth embodiment of the present invention.

FIG. 14 schematically shows a configuration of an optical unit according to a ninth embodiment of the present invention. In the optical unit 12 of the ninth embodiment, the light sources 1*a*, 1*b*, and 1*c*, the optical elements 2*a*, 2*b*, and 2*c*, and the color-combining element 3 are each retained by an independent hold member, with a heat-releasing member 11 being disposed in each hold member. Since the hold member and the heat-releasing member 11 are both constructed independently, heat from the light sources 1*a*, 1*b*, and 1*c* can be released without being conducted to the optical elements 2*a*, 2*b*, and 2*c*, the color-combining element 3, or the housing 444. This, in turn, prevents an optical output loss in the light sources 1*a*, 1*b*, and 1*c*, shifts in the positions of the respective light-emitting points, and peak wavelength drifts from occurring, and high image quality can be achieved as a result.

Figure 15:
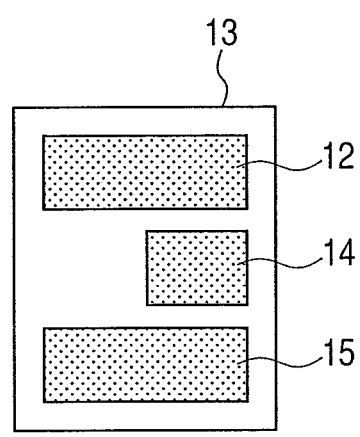
FIG. 15 is a diagram that shows an embodiment of an image display device.

An embodiment of an image display device in which an electric power supply unit 14, a circuit block 15, and a signal-processing unit are combined in the optical unit 12 of the above configuration is shown in FIG. 15. According to this embodiment, a compact and lightweight image-display device can be supplied.

The invention claimed is:

1. An optical unit comprising:
   a light source that emits light to be projected onto a screen;
   one or a plurality of optical elements that controls a spread of a beam of light from the light source to the screen;
   a combining element that combines the light emitted from the light source; and
   a scanning element;
   wherein the light source outputs an optical beam that will generate an elliptically shaped beam spot on the screen, the beam spot having a major axis substantially perpendicular to a scanning direction; and
   wherein the light source is driven with pulse width modulation (PWM) so that one driven pulse corresponds to one beam spot on the screen.

2. The optical unit according to claim 1, wherein one pixel on the screen is depicted by a plurality of driven pulses.

3. The optical unit according to claim 1, wherein the optical output levels of each driven pulses are varied.

4. The optical unit according to claim 1, wherein the light source includes a three-color light sources of red (R), green (G), and blue (B), and
   if time-varying changes in optical output levels of the light source as driven with pulse width modulation (PWM) are each expressed as P(t), a color temperature Kw that is calculated from chromaticity coordinates (xW, yW) derived from an expression of $$X_B = \int \left( \int_{t=0}^{t} P(t)dt \right) \times \exp(-x^2/2) \times \overline{X}(\lambda)d\lambda,$$

$$Y_B = \int \left( \int_{t=0}^{t} P(t)dt \right) \times \exp(-x^2/2) \times \overline{Y}(\lambda)d\lambda,$$

$$Z_B = \int \left( \int_{t=0}^{t} P(t)dt \right) \times \exp(-x^2/2) \times \overline{Z}(\lambda)d\lambda,$$

$$x_W = \frac{X_R + X_G + X_B}{(X_R + Y_R + Z_R) + (X_G + Y_G + Z_G) + (X_B + Y_B + Z_B)},$$

$$y_W = \frac{Y_R + Y_G + Y_B}{(X_R + Y_R + Z_R) + (X_G + Y_G + Z_G) + (X_B + Y_B + Z_B)}$$

satisfies 10,000 K≤Kw≤16,000 K.

5. The optical unit according to claim 1, wherein the light source, the optical elements, and the combining element are each retained by an independent hold member, and a heat-releasing member is disposed in each of the hold members.

6. An optical unit comprising:
   three, light sources arranged to emit red (R), green (G), and blue (B) light respectively and independently, suitable for projection onto a screen, the light sources configured to provide time-varying changes in optical output;
   a plurality of optical elements arranged to control a speed of light;
   a color-combining element arranged to combine the color of the light emitted from the light sources; and
   a scanning element configured to scan the color-combined light across a viewing plane across a number of pixels, each pixel having a pixel pitch in a scanning direction, the pixel pitch being determined by a scanning distance over which the light sources are activated;
   wherein the light sources are arranged to output an optical beam that will generate an elliptically shaped beam spot in the viewing plane, in which the screen is located in use, the beam spot having a major axis substantially perpendicular to a scanning direction; and wherein the optical unit is configured to control the spread of light in the viewing plane to the relational expression of $1.0d \leq \phi G \leq 1.5d$, $1.0d \leq \phi R \leq 1.5d$, $1.0d \leq 1.5d$, $\phi RB < 0.5d$, $\phi RG < 0.5d$, $\phi BG < 0.5d$, where a pixel pitch at the viewing plane is defined as "d"; a beam spot size at the viewing plane of the G-light, as $\phi G$; and a beam spot size at the viewing plane of the R-light, as $\phi R$; a beam spot size at the viewing plane of the B-light, as $\phi B$, a beam spot clearance between the R-light and the B-light, as $\phi RB$; a beam spot clearance between the R-light and the G-light, as $\phi RG$; and a beam spot clearance between the B-light and the G-light, as $\phi G$, the beam spot size and the beam spot clearance being taken in a direction perpendicular to the scanning direction.

7. The optical unit according to claim 6, wherein the color-combining element is formed so that of all components of the light from the light sources, only the R-light and the B-light enter that in an s-polarized state and the G-light enters that in a p-polarized state.

8. The optical unit according to claim 6, wherein a of the optical elements through which the B-light passes is smaller than that through which optical beams of the other colors pass.

9. The optical unit according to claim 6, wherein, if time-varying changes in optical output levels of the light source as driven with pulse width modulation (PWM) are each expressed as P(t), a color temperature Kw that is calculated from chromaticity coordinates (xW, yW) derived from an expression of $$X_B = \int \left( \int_{t=0}^{t} P(t)dt \right) \times \exp(-x^2/2) \times \overline{X}(\lambda)d\lambda,$$

$$Y_B = \int \left( \int_{t=0}^{t} P(t)dt \right) \times \exp(-x^2/2) \times \overline{Y}(\lambda)d\lambda,$$

$$Z_B = \int \left( \int_{t=0}^{t} P(t)dt \right) \times \exp(-x^2/2) \times \overline{Z}(\lambda)d\lambda,$$

$$x_W = \frac{X_R + X_G + X_B}{(X_R + Y_R + Z_R) + (X_G + Y_G + Z_G) + (X_B + Y_B + Z_B)},$$

$$y_W = \frac{Y_R + Y_G + Y_B}{(X_R + Y_R + Z_R) + (X_G + Y_G + Z_G) + (X_B + Y_B + Z_B)}$$

satisfies 10,000 K $\leq$ Kw $\leq$ 16,000 K.

10. The optical unit according to claim 6, wherein the light sources, the optical elements, and the color-combining element are each related by an independent hold member, and a heat-releasing member is disposed in each of the hold members.

* * * * *